United States Patent
Hirai (10) Patent No.: US 9,582,107 B2
(45) Date of Patent: Feb. 28, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventor: Takashi Hirai, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/146,396

(22) Filed: May 4, 2016

(65) Prior Publication Data
US 2016/0246442 A1 Aug. 25, 2016

Related U.S. Application Data

(63) Continuation of application No. 13/785,740, filed on Mar. 5, 2013, now Pat. No. 9,367,160.

(30) Foreign Application Priority Data

Jul. 18, 2012 (JP) .................................. 2012-159467

(51) Int. Cl.
G06F 3/045 (2006.01)
G06F 3/041 (2006.01)

(52) U.S. Cl.
CPC .......... *G06F 3/0416* (2013.01); *G06F 3/0412* (2013.01); *G06F 2203/04104* (2013.01)

(58) Field of Classification Search
CPC .................................................... G06F 3/0416
See application file for complete search history.

(56) References Cited

U.S. PATENT DOCUMENTS 8,599,131 B2 12/2013 Shiina
8,643,616 B1 * 2/2014 Zhang ................ G06F 3/04842
345/173

(Continued)

FOREIGN PATENT DOCUMENTS

JP 06-051908 A 2/1994
JP 08-076927 A 3/1996
JP 2011-81447 A 4/2011

OTHER PUBLICATIONS

Communication dated Feb. 23, 2016 from the Japanese Patent Office issued in corresponding Application No. 2012-159467.

*Primary Examiner* — Jason Olson
(74) *Attorney, Agent, or Firm* — Sughrue Mion, PLLC (57) ABSTRACT

An information processing apparatus includes a display having a display screen that displays an image; an acquiring section that acquires information indicating a contact point which is a position where an operator is brought into contact with the display screen by a user; a display controller that makes the display screen display an image showing a designation point designated by the user; and a setting section that sets an operation mode by switching between a first operation mode in which a disposition of the designation point relative to the contact point is changeable and a second operation mode in which the designation point is moved in accordance with movement of the contact point so that the disposition changed in the first operation mode is maintained. The display controller controls display of the designation point in accordance with the operation mode set by the setting section.

17 Claims, 7 Drawing Sheets

(56) References Cited

U.S. PATENT DOCUMENTS

2006/0244735 A1 11/2006 Wilson
2007/0097096 A1 5/2007 Rosenberg
2012/0026118 A1* 2/2012 Hackborn ........... G06F 3/03547
345/173

* cited by examiner

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is a continuation application of U.S. Ser. No. 13/785,740, filed Mar. 5, 2013, which is based on and claims priority under 35 USC 119 from Japanese Patent Application No. 2012-159467 filed Jul. 18, 2012.

BACKGROUND

Technical Field

The present invention relates to information processing apparatuses, information processing methods, and non-transitory computer readable media.

SUMMARY

According to an aspect of the invention, there is provided an information processing apparatus including a display, an acquiring section, a display controller, and a setting section. The display has a display screen that displays an image. The acquiring section acquires information indicating a contact point which is a position where an operator is brought into contact with the display screen by a user. The display controller makes the display screen display an image showing a designation point designated by the user. The setting section sets an operation mode by switching between a first operation mode in which a disposition of the designation point relative to the contact point is changeable and a second operation mode in which the designation point is moved in accordance with movement of the contact point so that the disposition changed in the first operation mode is maintained. The display controller controls display of the designation point in accordance with the operation mode set by the setting section.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
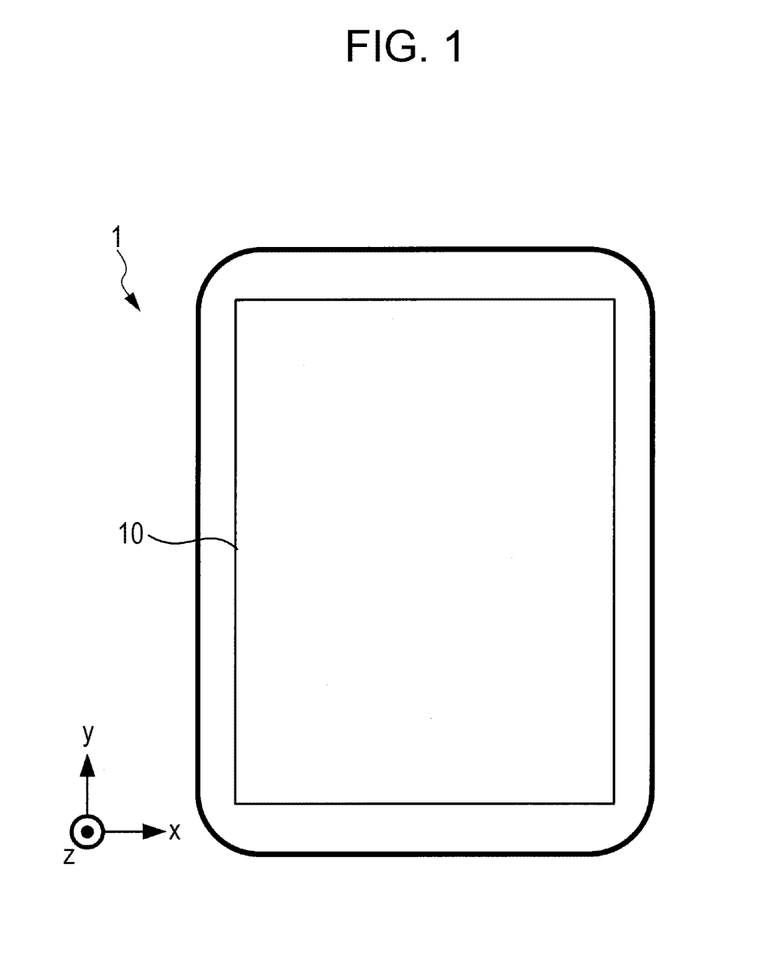
FIG. 1 is an external view illustrating the configuration of an information processing apparatus according to a first exemplary embodiment of the present invention.

FIG. 1 is an external view illustrating the configuration of an information processing apparatus 1 according to a first exemplary embodiment of the present invention. The information processing apparatus 1 is an electronic apparatus equipped with a display screen 10. The display screen 10 displays an image and accepts an operation by an operator, such as a user's finger. The display screen 10 has, for example, a rectangular shape that is vertically long. The display screen 10 may be of a three-dimensionally perceptible type based on, for example, unaided stereovision. The operator is not limited to a user's finger and may alternatively be, for example, a stylus pen, a glove, or a finger cot. In other words, the operator may be of any kind of body that is operable by the user and whose position in contact with the display screen 10 of the information processing apparatus 1 is detectable.

The information processing apparatus 1 has an appropriate size for allowing the user to operate the display screen 10 with his/her finger and is, for example, a mobile phone (including a smartphone), a tablet personal computer (PC), a slate PC, or a personal digital assistant (PDA). The size of the information processing apparatus 1 may be such that the user can operate the apparatus while holding it with his/her hand, or may be such that the user can operate the apparatus while the apparatus is placed on a desk or attached to a holder. The information processing apparatus 1 does not necessarily have to be tabular.

Figure 2:
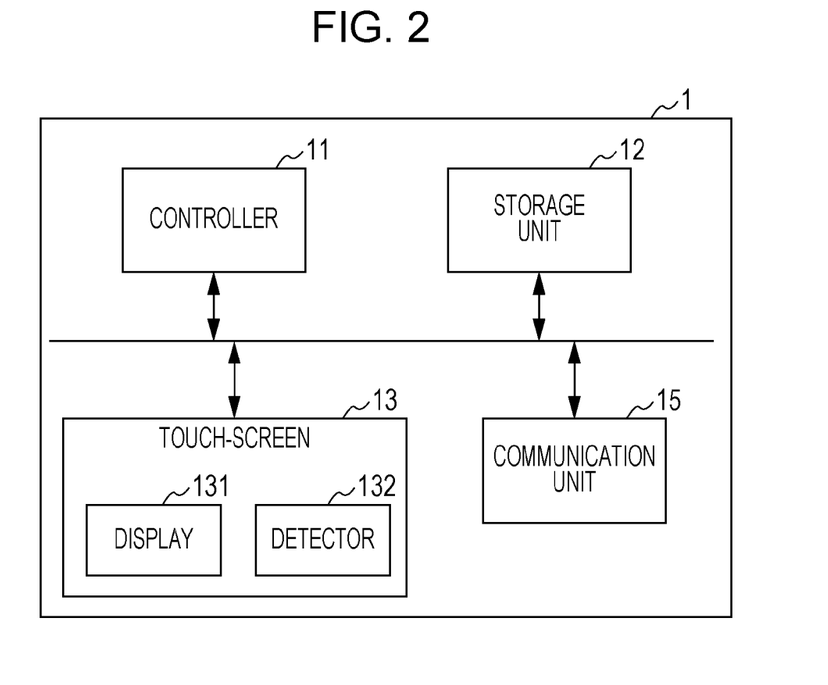
FIG. 2 is a block diagram illustrating a hardware configuration of the information processing apparatus.

FIG. 2 is a block diagram illustrating a hardware configuration of the information processing apparatus 1. The information processing apparatus 1 includes a controller 11, a storage unit 12, a touch-screen 13, and a communication unit 15. In addition to the components shown in FIG. 2, the information processing apparatus 1 may also include a speaker and a microphone (or input-output sections thereof), a camera (including a video camera), and a vibrator.

The controller 11 is configured to control the operation of each component in the information processing apparatus 1. The controller 11 includes an arithmetic processing unit, such as a central processing unit (CPU), and storage units, such as a read only memory (ROM) and a random access memory (RAM), and executes a program stored in the ROM or the storage unit 12 so as to achieve a graphical user interface (GUI) according to an exemplary embodiment of the present invention.

The storage unit 12 is configured to store data. The storage unit 12 includes a storage medium, such as a hard disk or a flash memory, and stores data to be used by the controller 11. The storage unit 12 may alternatively include a detachable storage medium, such as a so-called removable disk. The storage unit 12 stores programs to be executed by the controller 11 as well as data indicating various kinds of images to be displayed on the display screen 10. If multiple information processing apparatuses 1 are to be used by a single user or if a single information processing apparatus 1 is to be used by multiple users, the storage unit 12 may store identification information for identifying each user.

The touch-screen 13 is configured to display an image and also to accept an operation by the user. More specifically, the touch-screen 13 includes a display 131 that displays an image on the display screen 10 and a detector 132 that detects a position where the operator, such as a user's finger, is in contact with the display screen 10 so as to accept the user's operation performed on the display screen 10.

The display 131 includes a display panel that displays an image by a liquid-crystal element or an organic electroluminescence (EL) element and a drive circuit that drives this display panel, and makes the display screen 10 display an image in accordance with data supplied from the controller 11. The detector 132 includes a sensor that detects that the operator is in contact with the display screen 10, and supplies contact-point information, which indicates the detected contact position (referred to as "contact point" hereinafter) of the operator, to the controller 11.

The communication unit 15 is configured to transmit and receive data. The communication unit 15 may be an interface connected to a communication line, such as a mobile communication network or the Internet, or may be connected to another electronic apparatus without the intervention of a communication line, as in near-field-communication (NFC) based wireless communication.

Figure 3:
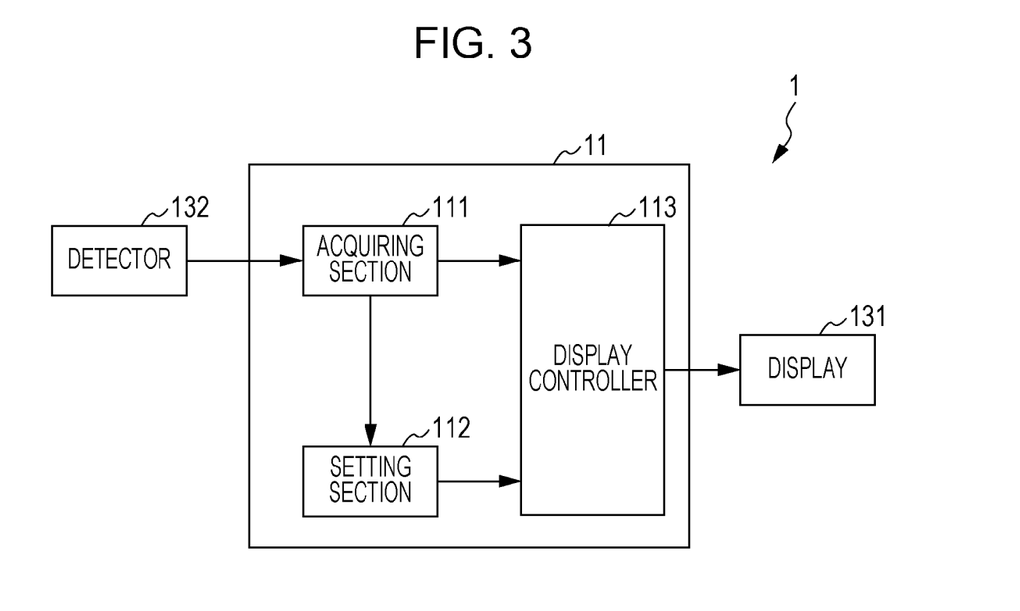
FIG. 3 illustrates a functional configuration of a controller of the information processing apparatus.

FIG. 3 illustrates a functional configuration of the controller 11 of the information processing apparatus 1. The controller 11 executes the aforementioned program so as to function as an acquiring section 111, a setting section 112, and a display controller 113. The acquiring section 111 acquires the contact-point information indicating the contact point detected by the detector 132 of the touch-screen 13.

The setting section 112 sets an operation mode to a disposition mode (i.e., a first operation mode) or a movement mode (i.e., a second operation mode). An operation performed by the user is intended for transmitting a designation point, which is a point designated by the user on the display screen 10, to the controller 11 of the information processing apparatus 1 and includes a combination and the order of a user's contact point on the display screen 10 and the contact mode at that contact point. There are two kinds of operation modes, which are the disposition mode and the movement mode mentioned above. The disposition mode is a mode in which the disposition of the designation point relative to the contact point is changeable. The movement mode is a mode for moving the designation point in accordance with movement of the contact point so that the disposition changed in the disposition mode is maintained.

These modes are switched when a predetermined operation is accepted or when a predetermined time elapses from a certain time point. The RAM of the controller 11 is provided with a mode storage region. When the aforementioned operation for switching modes is accepted or when one of the aforementioned conditions is satisfied, the setting section 112 achieved by the controller 11 renews the mode stored in this region.

The display controller 113 controls the display 131 so as to make the display screen 10 display an image showing the designation point. Furthermore, the display controller 113 identifies the contact point on the basis of the contact-point information acquired by the acquiring section 111 and refers to the operation mode set by the setting section 112. Then, if the operation mode is set in the disposition mode, the display controller 113 determines the disposition of the designation point relative to the contact point on the basis of this contact point. If the operation mode is set in the movement mode, the display controller 113 moves the designation point in accordance with movement of the contact point so that the disposition determined in the disposition mode is maintained.

Figure 4:
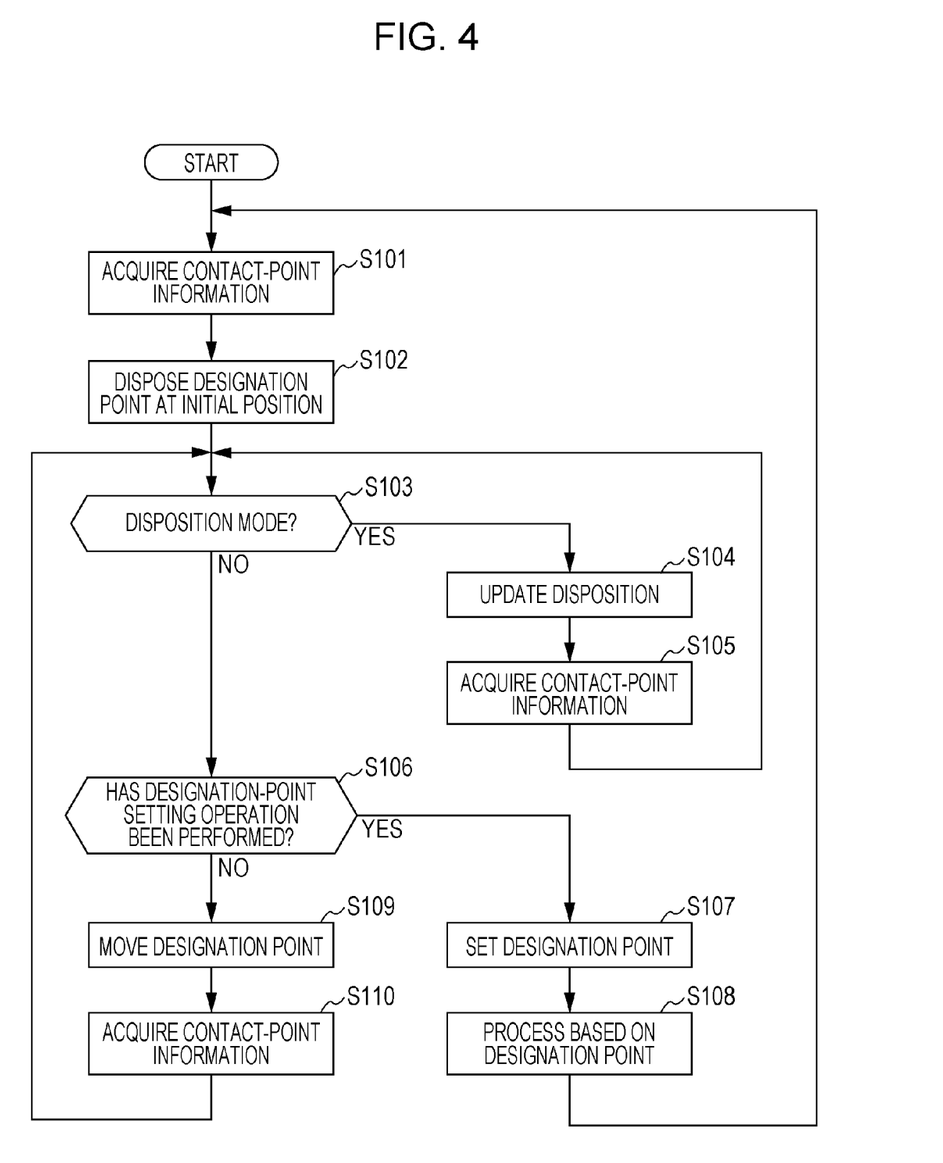
FIG. 4 is a flowchart illustrating the flow of a process executed by the controller of the information processing apparatus.

FIG. 4 is a flowchart illustrating the flow of a process executed by the controller 11 of the information processing apparatus 1. When the controller 11 acquires contact-point information indicating a contact point first detected by the detector 132 in step S101, the controller 11 determines an initial position of a designation point in accordance with a predetermined rule and disposes the designation point at this initial position in step S102. According to this rule, the initial position of the designation point may set at the same position as the contact point or at a position located away from the contact point by a predetermined distance in a predetermined direction. Alternatively, according to the aforementioned rule, a predetermined position on the display screen 10 may be set as the initial position regardless of the position of the contact point.

In step S103, the controller 11 determines whether or not the operation mode is set in the disposition mode. In the first exemplary embodiment, the controller 11 sets the operation mode to the disposition mode until a predetermined time (e.g., five seconds) elapses from a time point at which an operator comes into contact with the display screen 10. Therefore, the controller 11 determines that the operation mode is set in the disposition mode until the aforementioned time elapses. When the predetermined time has elapsed from the time point at which the display screen 10 is touched, the controller 11 sets the operation mode to the movement mode.

Specifically, the controller 11 according to the first exemplary embodiment functions as the setting section 112 that sets the operation mode to the disposition mode (i.e., the first mode) when the user touches the display screen 10 and that sets the operation mode to the movement mode (i.e., the second mode) when the predetermined time has elapsed since the disposition mode is set in a state where the user is continuously in contact with the display screen 10.

If it is determined that the operation mode is set in the disposition mode (YES in step S103), the controller 11 updates the disposition of the designation point in step S104 on the basis of the contact point indicated by the most recent contact-point information and acquires the next contact-point information from the detector 132 in step S105. Then, the controller 11 returns the process to step S103. Therefore, when the predetermined time has elapsed from the time point at which the operator is brought into contact with the display screen 10 by the user, the controller 11 determines that the operation mode is not set in the disposition mode.

On the other hand, if it is determined that the operation mode is not set in the disposition mode (NO in step S103), namely, when the operation mode is set in the movement mode, the controller 11 determines in step S106 whether or not a designation-point setting operation has been performed by the user. If it is determined that a designation-point setting operation has been performed (YES in step S106), the controller 11 sets the designation point in step S107 in accordance with the operation and executes a process based on the set designation point in step S108. The controller 11 having executed the aforementioned process returns the process to step S101.

In the first exemplary embodiment, an operation performed by the user for moving the operator away from the display screen 10 is defined as the designation-point setting operation. Therefore, when the operator in contact with the display screen 10 at the aforementioned contact point is moved away therefrom, the controller 11 determines that the designation-point setting operation has been performed and sets the designation point at that time point as the designation point to be used in the process. Then, the controller 11 performs the process by using coordinates of that designation point.

On the other hand, if it is determined that no designation-point setting operation has been performed (NO in step S106), the controller 11 moves the designation point in accordance with movement of the contact point in step S109 so as to maintain the disposition determined in the disposition mode. Then, the controller 11 acquires the next contact-point information from the detector 132 in step S110 and returns the process to step S103.

Figure 5A:
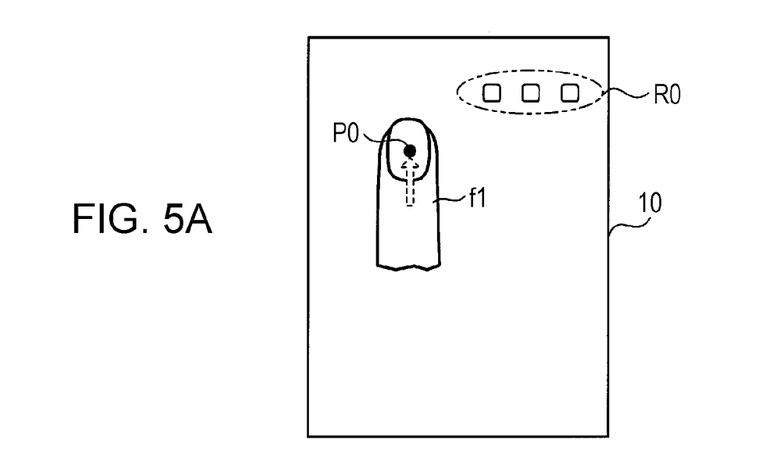
FIGS. 5A to 5C illustrate examples of images displayed on a display screen of the information processing apparatus according to each of first, second, and third exemplary embodiments.
Figure 5B:
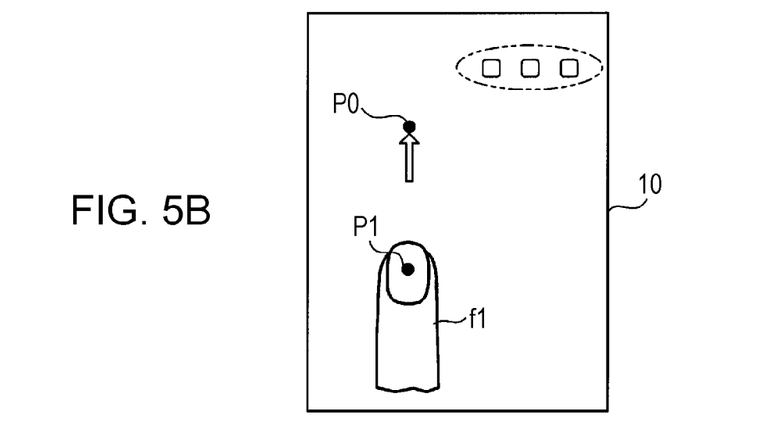
Figure 5C:
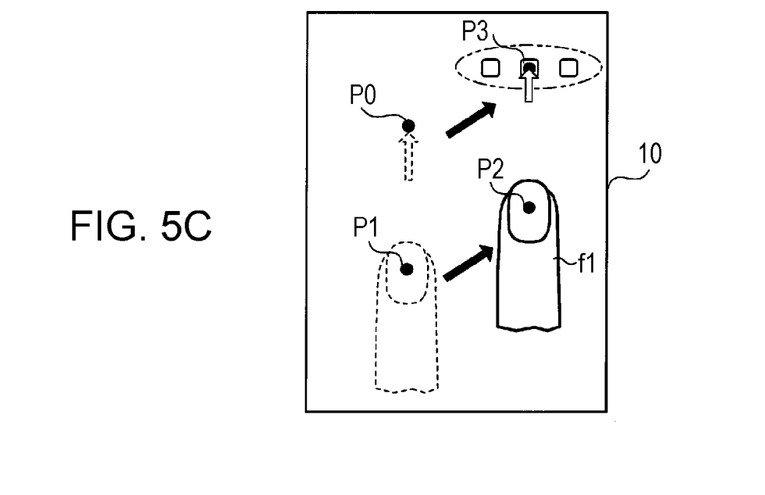

FIGS. 5A to 5C illustrate examples of images displayed on the display screen 10 of the information processing apparatus 1 according to each of first, second, and third exemplary embodiments. The display screen 10 in the first exemplary embodiment will be described below.

As shown in FIG. 5A, when the user touches the display screen 10 with his/her finger f1, the detector 132 of the information processing apparatus 1 detects a contact point at a position where the finger f1 and the display screen 10 are in contact with each other. Then, the controller 11 of the information processing apparatus 1 acquires contact-point information indicating the contact point from the detector 132 and sets the operation mode to the disposition mode. Furthermore, the controller 11 determines an initial position of a designation point in accordance with the predetermined rule and makes the display 131 display a designation point P0 at this initial position. In this case, the initial position is set to the position of the contact point indicated by the contact-point information.

Upon acquiring the contact-point information, the controller 11 interprets the time point of the acquisition of the contact-point information as a time point at which the display screen 10 is first touched by the user and stores the time point in the RAM. The controller 11 then measures the time elapsed from that time point. When the elapsed time exceeds five seconds, the controller 11 renews the operation mode to the movement mode.

When the user moves his/her finger f1 on the display screen 10 while keeping the finger f1 in contact therewith before five seconds elapse from the time point at which the display screen 10 is first touched by the user, the detector 132 detects the moving contact point in, for example, a periodical manner. During this time, the operation mode is set in the disposition mode. Therefore, the controller 11 updates the disposition of the designation point P0 relative to the contact point as the detected contact point moves. When five seconds have elapsed, the user's finger f1 has moved to the position shown in FIG. 5B. In this case, the position where the finger f1 and the display screen 10 are in contact with each other corresponds to a contact point P1. The controller 11 renews the operation mode to the movement mode and determines the disposition of the designation point P0 relative to the contact point P1.

After the operation mode is renewed to the movement mode, when the user moves his/her finger f1 on the display screen 10 while keeping the finger f1 in contact therewith, the controller 11 successively acquires the contact-point information indicating the moving contact point. When the user moves his/her finger f1 along an arrow shown in FIG. 5C, the contact point of the finger f1 moves from the contact point P1 to a contact point P2. In this case, the controller 11 moves the designation point so as to maintain the disposition between the contact point between the finger f1 and the display screen 10 and the designation point designated by the user. Specifically, as shown in FIG. 5C, when the contact point moves from the contact point P1 to the contact point P2, the designation point moves from the designation point P0 to a designation point P3.

When the user moves his/her finger f1, which is in contact with the display screen 10 at the contact point P2, away from the display screen 10, the controller 11 determines that a designation-point setting operation has been performed and sets the designation point P3 as the designation point to be used in a process. Then, the controller 11 executes the process using the set designation point P3. For example, three rectangular buttons are displayed in a display region R0 of the display screen 10. Because the designation point P3 is aligned with the middle button of the three buttons, the controller 11 determines that the middle button has been clicked and executes a process associated with this button.

Accordingly, the information processing apparatus 1 according to the first exemplary embodiment adjusts the disposition between the contact point and the designation point during a predetermined time period starting from the time point at which the user brings the operator into contact with the display screen 10. When the aforementioned time period has elapsed, the information processing apparatus 1 moves the designation point in accordance with movement of the contact point until the aforementioned operator is moved away from the display screen 10. Therefore, the designation point designated by the user is displayed at a user's desired location relative to the contact point touched by the user. By allowing the user to dispose the designation point at a position different from that of the contact point, the designation point is displayed without being hidden by the operator. With this configuration, the information processing apparatus 1 may achieve improved operability and suppress the possibility of erroneous operations, as compared with a case where the apparatus does not have this configuration.

In the first exemplary embodiment described above, the controller 11 sets the operation mode to the disposition mode until a predetermined time elapses from the time point at which the operator comes into contact with the display screen 10, and sets the operation mode to the movement mode when the aforementioned time has elapsed. Alternatively, the switching of the operation modes may be performed based on conditions other than the elapsed time. For example, the controller 11 may set the operation mode to the disposition mode during a period in which the operator brought into contact with the display screen 10 is moved thereon by a predetermined distance while being kept in contact with the display screen 10, and may set the operation mode to the movement mode after the aforementioned period. Specifically, the controller 11 may set the operation mode to the disposition mode (i.e., the first operation mode) when the operator is brought into contact with the display screen 10, and may set the operation mode to the movement mode (i.e., the second operation mode) when the contact point is moved, while the operator is kept in contact with the display screen 10, by a predetermined distance from the position of the contact point corresponding to when the disposition mode (i.e., the first operation mode) is set.

Second Exemplary Embodiment

The display screen 10 in the second exemplary embodiment will now be described. In the second exemplary embodiment, when the operator comes into contact with the display screen 10, the controller 11 sets the operation mode to the disposition mode. After the operation mode is set to the disposition mode, when the contact point where the operator is in contact with the display screen 10 is not moved for a predetermined time period, the controller 11 determines the disposition of the designation point based on the contact point and sets the operation mode to the movement mode.

Specifically, when the finger f1 shown in FIG. 5A comes into contact with the display screen 10, the controller 11 sets the operation mode to the disposition mode. Then, when the finger f1 is moved to the position shown in FIG. 5B by the user while being kept in contact with the display screen 10 and is not moved from this position for the predetermined time period, the controller 11 determines the disposition of the designation point and sets the operation mode to the movement mode. As a result, the disposition of the designation point P0 relative to the contact point P1 is determined.

Subsequently, as shown in FIG. 5C, when the user moves his/her finger f1 from the contact point P1 to the contact point P2 while keeping the finger f1 in contact with the display screen 10, the designation point moves from the designation point P0 in accordance with the moving direction and the moving distance of the finger f1 so as to be disposed at the designation point P3 shown in FIG. 5C. When the user moves his/her finger f1 shown in FIG. 5C away from the display screen 10, the designation point P3 is set as the designation point, and the controller 11 executes a process using the designation point P3.

In the example described above, the controller 11 sets the operation mode to the movement mode when the user does not move the operator for the predetermined time period. Alternatively, the controller 11 may set the operation mode to the movement mode when the user reduces the moving speed of the operator on the display screen 10 such that the moving speed of the detected contact point is made lower than a predetermined speed. In this case, after the operation mode is set to the disposition mode, when the contact point where the operator is in contact with the display screen 10 moves at a speed that is lower than a threshold value for a predetermined time period, the controller 11 determines the disposition of the designation point based on the contact point and sets the operation mode to the movement mode.

It may sometimes be difficult for the user to ascertain the moment at which the predetermined time period has elapsed. Since the information processing apparatus 1 according to the second exemplary embodiment switches the operation mode from the disposition mode to the movement mode when the user actively stops or reduces the moving speed of the contact point, the possibility of erroneous operations may be suppressed as compared with the information processing apparatus 1 according to the first exemplary embodiment.

Third Exemplary Embodiment

The display screen 10 in the third exemplary embodiment will now be described. In the third exemplary embodiment, the controller 11 sets the operation mode to the disposition mode when the operator is moved away from the display screen 10. After the operation mode is set to the disposition mode, when the operator is brought into contact with the display screen 10 again, the controller 11 determines the disposition of the designation point based on the contact point and sets the operation mode to the movement mode.

In this case, in order to interpret the operation performed by the user for moving the operator away from the display screen 10 as the designation-point setting operation, the controller 11 decides whether to switch the operation mode to the disposition mode or to set the designation point and execute a process when detecting this operation. In the information processing apparatus 1 according to the third exemplary embodiment, the controller 11 interprets this operation as the designation-point setting operation when there is no contact point for a time period that is longer than a predetermined time (namely, when the operator is kept away from the display screen 10 for a time period that is longer than the predetermined time). On the other hand, when the operator moved away from the display screen 10 is brought into contact with the display screen 10 again before the aforementioned time elapses, the controller 11 determines the disposition of the designation point based on the new contact point.

Specifically, when the user moves his/her finger f1 located at the position shown in FIG. 5A away from the display screen 10 and brings the finger f1 into contact with the display screen 10 at the position shown in FIG. 5B within a predetermined time (e.g., five seconds) from the moment the finger f1 is moved away from the display screen 10, the disposition of the designation point P0 relative to the contact point P1 is determined. When the user moves his/her finger f1 from the contact point P1 to the contact point P2 while keeping the finger f1 in contact with the display screen 10, the designation point moves from the designation point P0 in accordance with the moving direction and the moving distance of the finger f1. As a result, the designation point is disposed at the designation point P3 shown in FIG. 5C. When the user keeps his/her finger f1 shown in FIG. 5C away from the display screen 10 for five seconds or longer, the designation point P3 is set as the designation point, and the controller 11 executes a process using the designation point P3.

In the information processing apparatus 1 according to the third exemplary embodiment, even if the operator is kept away from the display screen 10, the designation point is not immediately set so that a chance for changing the disposition between the designation point and the contact point is given. Therefore, in the information processing apparatus 1 according to the third exemplary embodiment, the disposition of the designation point relative to the contact point is updated any number of times by allowing the user to bring the operator into contact with the display screen 10 again within the predetermined time.

When a specific operation for moving the finger f1 into and out of contact with the display screen 10 is performed by the user, the controller 11 may interpret this operation as the designation-point setting operation. Specifically, for example, when an operation of moving the operator away from the display screen 10 and then bringing the operator into contact with the display screen 10 is repeated twice within a predetermined time (e.g., 0.5 seconds), the controller 11 may interpret this operation as the designation-point setting operation and execute a process using this designation point. In this case, if an operation that involves moving the operator away from the display screen 10, moving the operator into contact with the display screen 10, moving the operator away from the display screen 10, and then moving the operator into contact with the display screen 10 is not performed within the aforementioned predetermined time, the controller 11 determines that no designation-point setting operation has been performed. Therefore, the controller 11 determines that an operation performed by the user for moving the operator away from the display screen 10 is intended for switching the operation mode to the disposition mode. In other words, if a so-called "point-and-click" operation mentioned above is not performed within the aforementioned predetermined time, when the user subsequently brings the operator into contact with the display screen 10 again, the controller 11 determines the disposition of the designation point based on the new contact point. Consequently, in this case, when determining the disposition of the designation point relative to the contact point, the time given to the user for bringing the operator into contact with the display screen 10 again after moving the operator away from the display screen 10 is not limited.

Fourth Exemplary Embodiment

Figure 6A:
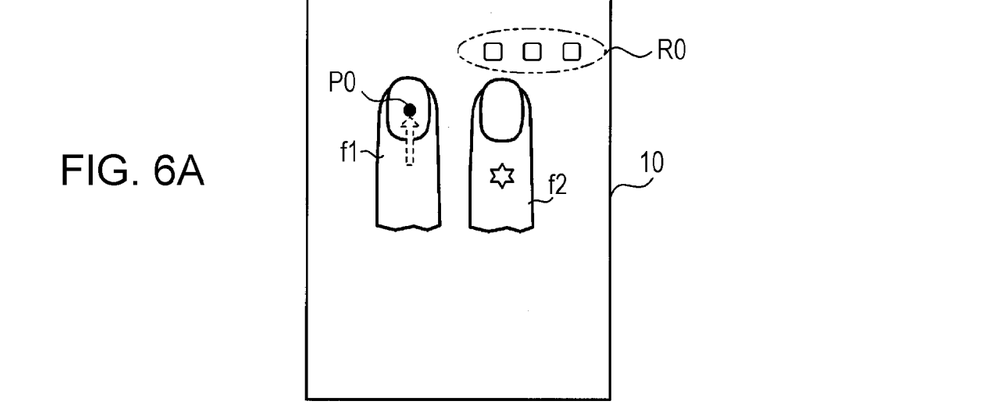
FIGS. 6A to 6C illustrate examples of images displayed on a display screen of an information processing apparatus according to a fourth exemplary embodiment.
Figure 6B:
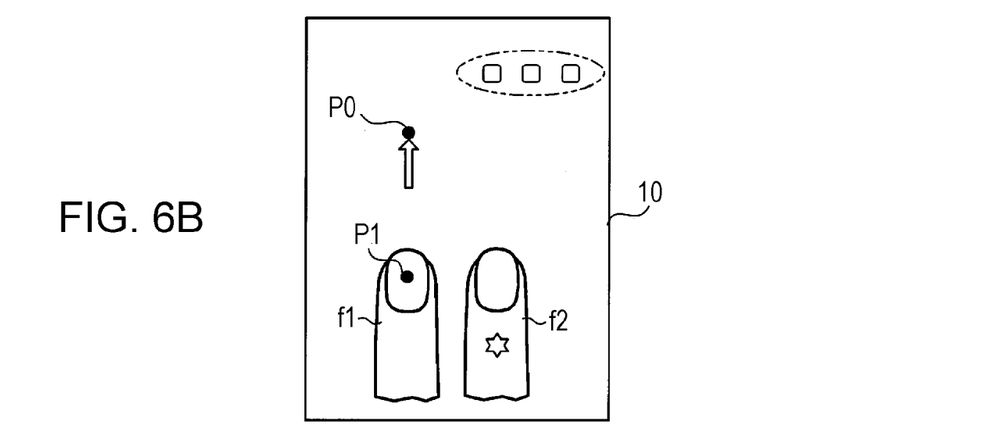
Figure 6C:
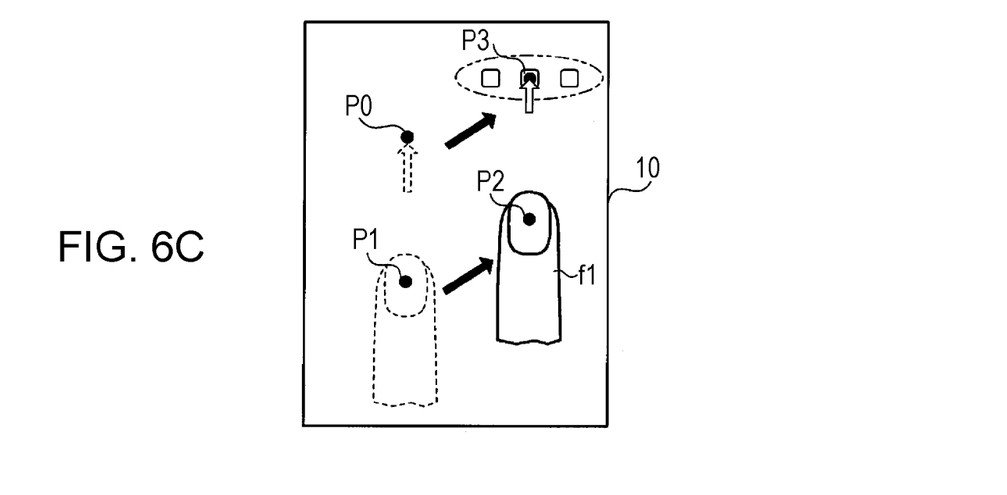

A display screen 10 in a fourth exemplary embodiment will now be described. FIGS. 6A to 6C illustrate examples of images displayed on the display screen 10 of an information processing apparatus 1 according to the fourth exemplary embodiment. In the fourth exemplary embodiment, the detector 132 corresponds to a so-called multi-touch function that simultaneously detects multiple contact points. The controller 11 in the fourth exemplary embodiment sets the operation mode to the disposition mode when, for example, the user keeps an operator in contact with a contact point (referred to as "first contact point" hereinafter), where the operator is first brought into contact with the display screen 10, and brings another operator into contact with a contact point (referred to as "second contact point" hereinafter) that is different from the first contact point. Then, when the operator in contact with the display screen 10 at the second contact point is moved away therefrom, the controller 11 sets the operation mode to the movement mode.

When the operation mode is set in the disposition mode, the controller 11 in the fourth exemplary embodiment determines the disposition of the designation point relative to the first contact point without moving the designation point. When the operation mode is set in the movement mode, the controller 11 moves the designation point in accordance with movement of the first contact point so as to maintain the disposition of the designation point determined in the disposition mode relative to the first contact point.

Specifically, when the user brings his/her finger f1 into contact with the display screen 10 at a position shown in FIG. 6A in a state where there are no contact points on the display screen 10, the controller 11 disposes the designation point at the position of the first contact point where the finger f1 is in contact with the display screen 10. In other words, the controller 11 identifies the designation point P0 shown in FIG. 6A. Subsequently, when the user brings his/her finger f2 different from the finger f1 into contact with the display screen 10 at a position shown in FIG. 6A, the controller 11 sets the operation mode to the disposition mode.

After the operation mode is set to the disposition mode, when the user moves his/her fingers f1 and f2 to respective positions shown in FIG. 6B while keeping the fingers f1 and f2 in contact with the display screen 10, the controller 11 moves a first contact point P1 set by the finger f1 without moving the designation point P0. When the user moves his/her finger f2 away from the display screen 10 in the state shown in FIG. 6B, the controller 11 determines the disposition of the designation point P0 relative to the first contact point P1 and renews the operation mode to the movement mode.

After the operation mode is renewed to the movement mode, when the user moves his/her finger f1 along an arrow shown in FIG. 6C, the first contact point of the finger f1 moves from the first contact point P1 to a first contact point P2. In this case, the controller 11 moves the designation point so as to maintain the disposition between the first contact point between the finger f1 and the display screen 10 and the designation point designated by the user. Specifically, as shown in FIG. 6C, when the first contact point moves from the first contact point P1 to the first contact point P2, the designation point moves from the designation point P0 to the designation point P3.

Accordingly, the information processing apparatus 1 according to the fourth exemplary embodiment adjusts the disposition of the designation point relative to the first contact point while the user keeps two operators (such as two fingers) in contact with two positions on the display screen 10. When the second operator is moved away from the display screen 10, the information processing apparatus 1 moves the designation point in accordance with movement of the first contact point of the remaining first operator. Therefore, the information processing apparatus 1 may achieve improved operability and suppress the possibility of erroneous operations, as compared with a case where the apparatus does not have this configuration.

Although the user brings two operators into contact with different positions on the display screen 10 in the fourth exemplary embodiment described above, the user may alternatively bring three or more operators into contact with respective positions on the display screen 10. In this case, the information processing apparatus 1 may set the operation mode to the disposition mode (i.e., the first operation mode) when there are multiple contact points, and to the movement mode (i.e., the second operation mode) when there is one contact point. In other words, the information processing apparatus 1 may be configured to switch and set the operation mode based on whether there are multiple contact points or there is one contact point.

Fifth Exemplary Embodiment

Figure 7A:
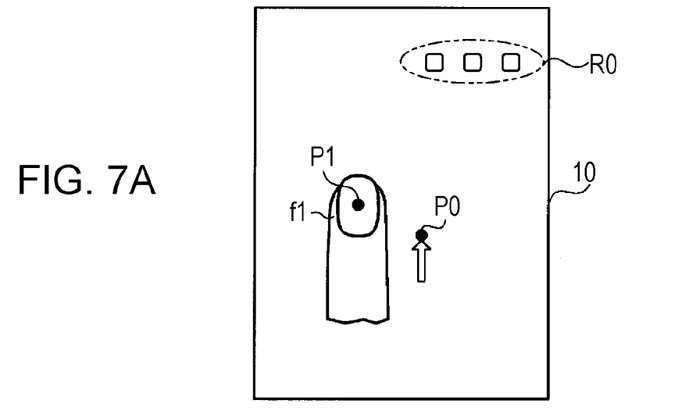
FIGS. 7A to 7C illustrate examples of images displayed on a display screen of an information processing apparatus according to a fifth exemplary embodiment.
Figure 7B:
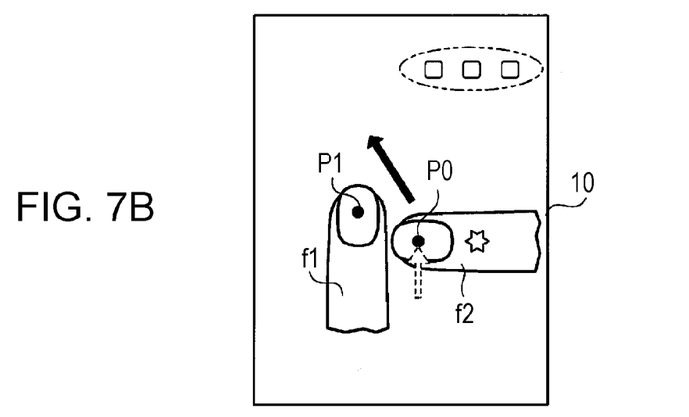
Figure 7C:
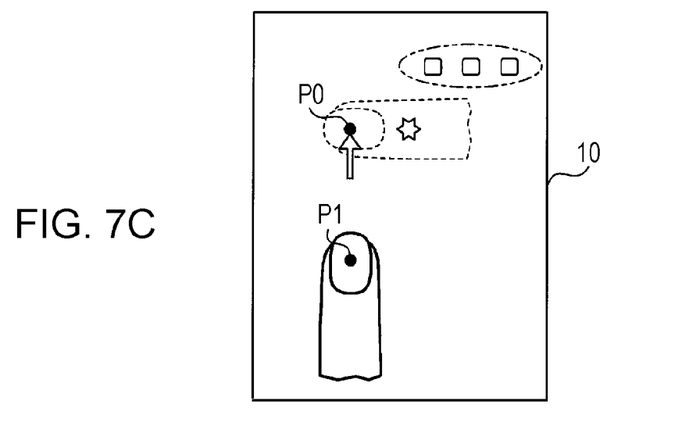

A display screen 10 in a fifth exemplary embodiment will now be described. FIGS. 7A to 7C illustrate examples of images displayed on the display screen 10 of an information processing apparatus 1 according to the fifth exemplary embodiment. In the fifth exemplary embodiment, the detector 132 corresponds to a so-called multi-touch function that simultaneously detects multiple contact points. The controller 11 in the fifth exemplary embodiment sets the operation mode to the disposition mode when, for example, the user keeps an operator in contact with the first contact point, where the operator is first brought into contact with the display screen 10, and brings another operator into contact with the second contact point that is different from the first contact point. Then, when the operator in contact with the display screen 10 at the second contact point is moved away therefrom, the controller 11 sets the operation mode to the movement mode.

When the operation mode is set in the disposition mode, the controller 11 in the fifth exemplary embodiment moves the designation point in accordance with movement of the second contact point so as to determine the disposition of the designation point relative to the first contact point. When the operation mode is set in the movement mode, the controller 11 moves the designation point in accordance with movement of the first contact point so as to maintain the disposition of the designation point determined in the disposition mode relative to the first contact point.

Specifically, as shown in FIG. 7A, when the operation mode is set in the movement mode, the disposition of the designation point P0 relative to the first contact point P1 where the finger f1 is in contact with the display screen 10 is determined. In this case, the disposition of the first contact point P1 relative to the designation point P0 does not change even if the finger f1 is moved anywhere. However, if the designation point P0 is disposed at the lower right side of the first contact point P1, as shown in FIG. 7A, it may be difficult for the user to perform an operation. Therefore, as shown in FIG. 7B, the user may bring his/her finger f2 into contact with the display screen 10 by aligning the finger f2 with the designation point P0 and move the finger f2 in a direction indicated by an arrow while keeping the finger f1 in contact with the display screen 10. Because the finger f2 is in contact with the display screen 10 while being aligned with the designation point P0, the second contact point touched by the finger f2 is aligned with the designation point P0.

When the finger f2, which is the second finger, comes into contact with the display screen 10, the controller 11 sets the operation mode to the disposition mode, whereby the disposition of the designation point relative to the first contact point becomes cancelled. Then, the controller 11 moves the displayed position of the designation point P0 in accordance with movement of the second contact point touched by the finger f2. As a result, the designation point P0 moves to a position shown in FIG. 7C. When the user moves his/her finger f2 away from the display screen 10 after moving the finger f2 to the position shown in FIG. 7C, the controller 11 sets the operation mode to the movement mode. Consequently, the disposition of the designation point P0 shown in FIG. 7C relative to the first contact point P1 is determined, and the designation point P0 moves in accordance with movement of the contact point P1 such that this disposition is maintained.

Accordingly, the information processing apparatus 1 according to the fifth exemplary embodiment moves the designation point in accordance with movement of the second contact point while the user keeps two operators in contact with two positions, i.e., the first contact point and the second contact point, on the display screen 10, thereby adjusting the disposition of the designation point relative to the first contact point. Then, when the second operator (such as the second finger) is moved away from the display screen 10, the information processing apparatus 1 moves the designation point in accordance with movement of the first contact point by the remaining first operator. Therefore, the information processing apparatus 1 may achieve improved operability and suppress the possibility of erroneous operations, as compared with a case where the apparatus does not have this configuration.

In the fifth exemplary embodiment described above, during a time period in which the user keeps two operators in contact with two positions, i.e., the first contact point and the second contact point, on the display screen 10, the designation point is moved in accordance with movement of the most-recently-touched second contact point. Alternatively, the designation point may be moved in accordance with movement of the first contact point. In other words, when there are multiple contact points and the mode is set in the disposition mode (i.e., the first operation mode), the information processing apparatus 1 may move the designation point in accordance with movement of one of the multiple contact points so as to change the disposition of the designation point relative to the other contact point. In this case, there are various ways to determine which of the multiple contact points is to be set as the contact point that makes the designation point move. For example, as described above, the contact point that makes the designation point move may be a contact point that is most recently touched or may be a contact point corresponding to a predetermined order of contact, such as a secondarily contacted point.

Modifications

The exemplary embodiments described above may be combined where appropriate. In addition, the exemplary embodiments may be modified as follows. Moreover, the following modifications may be combined where appropriate.

First Modification

Figure 8A:
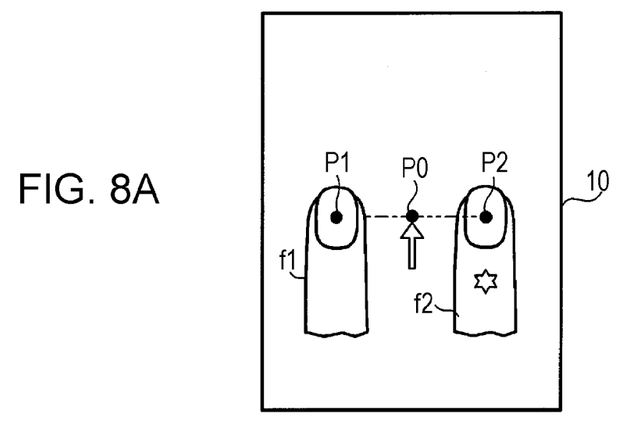
FIGS. 8A to 8C illustrate examples of images displayed on a display screen of an information processing apparatus according to a modification.
Figure 8B:
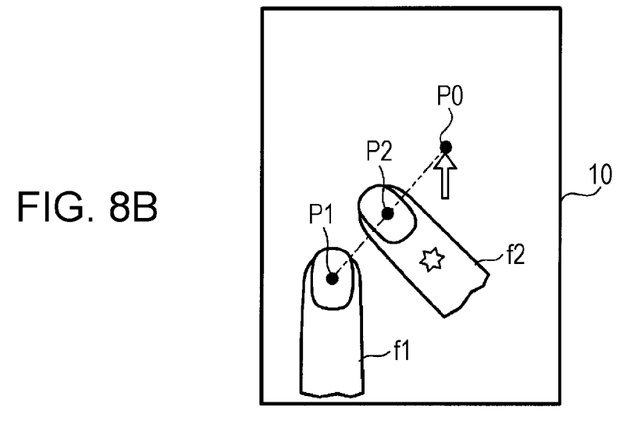
Figure 8C:
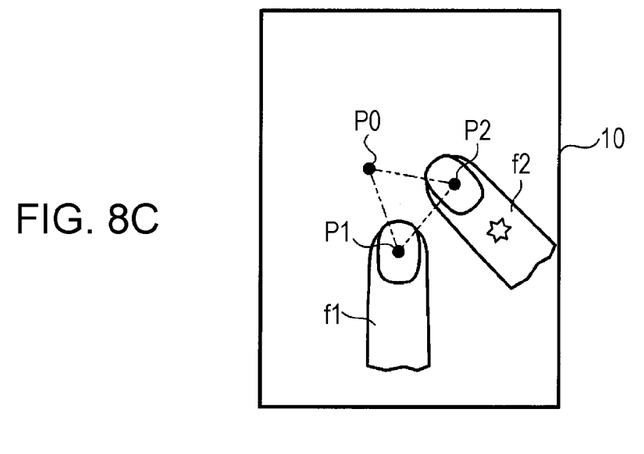

When the operation mode is set in the disposition mode, the controller 11 may display the designation point at a position that is different from the first contact point and the second contact point and that is set based on the first contact point and the second contact point. FIGS. 8A to 8C illustrate examples of images displayed on a display screen 10 of an information processing apparatus 1 according to this modification. In FIGS. 8A to 8C, an operator first brought into contact with the display screen 10 by the user corresponds to a finger f1, and the contact point of the finger f1 corresponds to a first contact point P1. Moreover, an operator secondarily brought into contact with the display screen 10 by the user corresponds to a finger f2, and the contact point of the finger f2 corresponds to a second contact point P2.

For example, as shown in FIG. 8A, the designation point P0 may be a midpoint on a line segment having the first contact point P1 and the second contact point P2 as opposite ends. Specifically, the designation point P0 may be located on the line segment having the first contact point P1 and the second contact point P2 as opposite ends and may be separated by an equal distance from the first contact point P1 and the second contact point P2.

Furthermore, for example, as shown in FIG. 8B, the designation point P0 may be set such that the second contact point P2 is a midpoint on a line segment having the first contact point P1 and the designation point P0 as opposite ends.

Furthermore, for example, as shown in FIG. 8C, the designation point P0 may be set such that the designation point P0, the first contact point P1, and the second contact point P2 are apexes of a regular triangle. In this case, for example, the aforementioned regular triangle may be set such that a polygonal line that connects the designation point P0, the first contact point P1, and the second contact point P2 in that order extends counterclockwise on the display screen 10.

Second Modification

Although the first contact point and the second contact point are not interchanged with each other in the fourth exemplary embodiment, the fifth exemplary embodiment, and the first modification described above, the controller 11 of the information processing apparatus 1 may interchange the first contact point and the second contact point if the second contact point is moved away prior to the first contact point. Specifically, if an operator is moved away from the first contact point before another operator is moved away from the second contact point, the controller 11 may set this second contact point as a new first contact point and set the operation mode to the movement mode.

Third Modification

Each of the programs to be executed by the controller 11 of the information processing apparatus 1 may be provided in a stored state in a computer readable recording medium, which includes a magnetic recording medium, such as magnetic tape or a magnetic disk, an optical recording medium, such as an optical disk, a magneto-optical recording medium, and a semiconductor memory. Furthermore, these programs may be downloaded via a communication line, such as the Internet. The controller 11 described above as an example of a control unit may be of various kinds of devices other than a CPU, and may be, for example, a dedicated processor.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display configured to display an image;
a detector configured to detect a first contact point of the display and to determine an initial position of a designation point that is displayed on the display, the designation point corresponding to the first contact point, to detect a second contact point of the display, and to detect a simultaneous movement of the first contact point and the second contact point on the display; and
a controller configured to, in response to the detector detecting the second contact point when the detector does not detect the first contact point, control the displayed designation point to move in accordance with movement of the second contact point and to, in response to the detector detecting the simultaneous movement, hold the designation point stationary until the detector does not detect the second contact point and to subsequently move the displayed designation point in accordance with movement of the first contact point.

2. The information processing apparatus according to claim 1, wherein the first contact point comprises a first point where a first operator contacts the display, and
wherein the first operator is operated by a user.

3. The information processing apparatus according to claim 2, wherein the designation point comprises a point designated by the user.

4. The information processing apparatus according to claim 2, wherein the second contact point comprises a second point where a second operator contacts the display, and
wherein the second operator is operated by the user.

5. The information processing apparatus according to claim 4, wherein the first operator comprises a first finger of the user, and
wherein the second operator comprises a second finger of the user.

6. A non-transitory computer readable storage medium storing instructions for causing a computer to execute a process comprising:
displaying an image on a display;
detecting a first contact point of the display and determining an initial position of a designation point that is displayed on the display, the designation point corresponding to the first contact point;
detecting a second contact point of the display;
controlling, in response to detecting the second contact point when not detecting the first contact point, the displayed designation point to move in accordance with movement of the second contact point;
detecting a simultaneous movement of the first contact point and the second contact point on the display; and
controlling, in response to detecting the simultaneous movement, the displayed designation point to be held stationary until the second contact point is no longer detected and subsequently moving the displayed designation point in accordance with movement of the first contact point.

7. The non-transitory computer readable storage medium according to claim 6, wherein the first contact point comprises a first point where a first operator contacts the display, and
wherein the first operator is operated by a user.

8. The non-transitory computer readable storage medium according to claim 7, wherein the designation point comprises a point designated by the user.

9. The non-transitory computer readable storage medium according to claim 7, wherein the second contact point comprises a second point where a second operator contacts the display, and
wherein the second operator is operated by the user.

10. The non-transitory computer readable storage medium according to claim 9, wherein the first operator comprises a first finger of the user, and
wherein the second operator comprises a second finger of the user.

11. The information processing apparatus of claim 1, wherein the detector is further configured to detect another movement of the second contact point on the display while the first contact point is held stationary and, wherein the controller is further configured to control the displayed designation point to move in accordance with the another movement of the second contact point.

12. The information processing apparatus of claim 1, wherein the controller is further configured to control the designation point to be displayed at the initial position in response to the first contact point contacting the initial position.

13. The information processing apparatus of claim 1, wherein the controller is further configured to control the designation point to be displayed between the first contact point and the second contact point in response to detection of the first contact point and the second contact point.

14. The information processing apparatus of claim 1, wherein the controller is further configured to display the designation point along an imaginary line extending along the display from the first contact point and the second contact point.

15. The information processing apparatus of claim 1, wherein the controller is further configured to control the designation point to be displayed at a position of the display such that the designation point, at the position, and the first contact point and the second contact point form an imaginary equilateral triangle along the display.

16. The information processing apparatus of claim 1, wherein the controller is further configured to perform a selection operation of an item displayed on the display when the designation point is superimposed on the item and the detector detects a double tap operation of any of the first contact point and the second contact point.

17. The information processing apparatus of claim 1, further comprising a setting section configured to set an operation mode by switching between a first operation mode in which a disposition of the designation point relative to the first contact point is changeable and a second operation mode in which the designation point is moved in accordance with movement of the first contact point so that the disposition changed in the first operation mode is maintained.

* * * * *